(12) United States Patent
Yang

(10) Patent No.: US 12,143,012 B1
(45) Date of Patent: *Nov. 12, 2024

(54) POWER CONVERTER WITH HIGH CONVERSION EFFICIENCY

(71) Applicant: Xiaobin Yang, Shenzhen (CN)

(72) Inventor: Xiaobin Yang, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,644

(22) Filed: Jan. 26, 2024

Related U.S. Application Data

(63) Continuation of application No. 18/492,737, filed on Oct. 23, 2023, now Pat. No. 11,901,812.

(51) Int. Cl.
*H02M 3/157* (2006.01)
*H02M 1/44* (2007.01)
*H02M 5/293* (2006.01)

(52) U.S. Cl.
CPC ............ *H02M 3/157* (2013.01); *H02M 1/44* (2013.01); *H02M 5/293* (2013.01)

(58) Field of Classification Search
CPC .................................................... H02M 5/293
See application file for complete search history.

(56) References Cited

U.S. PATENT DOCUMENTS

| | | | | |
|---|---|---|---|---|
| 5,019,952 A * | 5/1991 | Smolenski | ............ | H02M 3/156 363/124 |
| 7,640,795 B2 * | 1/2010 | Raichle | ................... | F02N 11/10 73/114.62 |
| 9,825,560 B2 * | 11/2017 | Li | ............................ | H01F 17/04 |
| 2002/0199131 A1 * | 12/2002 | Kocin | ....................... | H02J 7/34 714/14 |
| 2004/0095785 A1 * | 5/2004 | Balakrishnan | .......... | H02M 1/44 363/44 |
| 2009/0080222 A1 * | 3/2009 | Popescu | ............ | H02M 3/33523 363/20 |
| 2010/0142233 A1 * | 6/2010 | Huang | ................ | H02M 7/4807 363/37 |
| 2012/0104981 A1 * | 5/2012 | Tseng | ........................ | H02P 6/34 318/400.3 |
| 2012/0146526 A1 * | 6/2012 | Lam | .................... | H05B 41/2824 315/200 R |
| 2013/0094255 A1 * | 4/2013 | Yeh | ....................... | H02M 1/4225 363/44 |

(Continued)

*Primary Examiner* — Yusef A Ahmed
(74) *Attorney, Agent, or Firm* — RC Trademark Company

(57) ABSTRACT

According to some embodiments, a power converter is disclosed. The power converter includes an input electromagnetic interference filter to receive raw AC power and to output filtered AC power. A type-pi filter, and switch, receives the filtered AC power, further filters the received filtered AC power, and receives an indication from a digital controller module that an amplitude, frequency, and phase information of the filtered AC voltage is within a range of acceptable values and outputs the further filtered AC Power. The power conversion circuit receives a signal from the digital controller, receives the further filtered AC power from the type-pi filter and switch, converts the further filtered AC power to a desired voltage and outputs converted AC power. An output electromagnetic interference filter receives the converted AC power from the output electromagnetic interference filter and outputs the filtered converted AC power.

2 Claims, 4 Drawing Sheets

(56) References Cited

U.S. PATENT DOCUMENTS

| | | | | |
|---|---|---|---|---|
| 2013/0249397 | A1* | 9/2013 | Chandran | H05B 41/39 |
| | | | | 315/85 |
| 2014/0313795 | A1* | 10/2014 | Mi | H02M 1/126 |
| | | | | 333/167 |
| 2015/0180353 | A1* | 6/2015 | Tsai | H02M 3/33515 |
| | | | | 363/21.01 |
| 2015/0364989 | A1* | 12/2015 | Chung | H02M 1/12 |
| | | | | 363/44 |
| 2016/0211737 | A1* | 7/2016 | Yang | H02M 1/44 |
| 2017/0117813 | A1* | 4/2017 | Lee | H02M 3/33523 |
| 2017/0302160 | A1* | 10/2017 | Marcinkiewicz | H02P 27/06 |
| 2018/0183325 | A1* | 6/2018 | Kuang | H02M 3/3385 |
| 2019/0037656 | A1* | 1/2019 | Tsai | H01L 23/552 |
| 2019/0101967 | A1* | 4/2019 | Yuuki | G06F 1/266 |
| 2020/0220452 | A1* | 7/2020 | Lim | H02M 1/126 |
| 2021/0281161 | A1* | 9/2021 | Acker | H02M 1/15 |
| 2021/0408899 | A1* | 12/2021 | Dai | H02M 1/44 |
| 2023/0109575 | A1* | 4/2023 | Poon | H02M 1/44 |
| | | | | 363/21.01 |
| 2023/0253878 | A1* | 8/2023 | Hanson | H02M 1/44 |
| | | | | 323/282 |
| 2023/0276553 | A1* | 8/2023 | Kim | H05B 45/37 |
| | | | | 315/200 R |

* cited by examiner

POWER CONVERTER WITH HIGH CONVERSION EFFICIENCY

BACKGROUND

International travelers often need to bring along their favorite electronic devices. However, due to the differences in voltage standards between countries, these devices often require a power converter to adjust to the local voltage that is needed by the device. Additionally, some people prefer to buy imported appliances, which often have higher quality or unique features. However, the voltage standards of these imported appliances might not match the local standard, making them difficult to use. Therefore, these individuals also need a power converter to adapt the appliances.

Traditionally, iron-core transformers are used for voltage conversion. The manufacturing process of these transformers is relatively simple and consists of winding two coils onto the same iron core and adjusting the number of turns to get the desired output voltage. Although iron-core transformers are simple to make, they have some clear disadvantages, such as their large size, heavy weight, and low conversion efficiency. Low efficiency can lead to heat issues, exacerbating cooling problems. Additionally, their large size and weight make them inconvenient for travelers to carry and use. It would therefore be desirable to provide a lighter weight, and smaller, power converter that can adjust to local voltages.

SUMMARY

Some embodiments described herein relate to a power converter. The power converter comprises an input electromagnetic interference filter to receive raw AC power and to output filtered AC power. A type-pi filter, and switch, receives the filtered AC power, further filters the received filtered AC power, and receives an indication from a digital controller module that an amplitude, frequency, and phase information of the filtered AC voltage is within a range of acceptable values and outputs the further filtered AC power. The power conversion circuit receives a signal from the digital controller, receives the further filtered AC power from the type-pi filter and switch, converts the further filtered AC power to a desired voltage and outputs converted AC power. An output electromagnetic interference filter receives the converted AC power from the output electromagnetic interference filter and outputs the filtered converted AC power.

DETAILED DESCRIPTION

In the following detailed description, numerous specific details are set forth to provide a thorough understanding of the embodiments. However, it will be understood by those of ordinary skill in the art that the embodiments may be practiced without these specific details. In other instances, well-known methods, procedures, components, and circuits have not been described in detail so as not to obscure the embodiments.

To address the issues with traditional power converters, the embodiments described herein relate to an AC-to-AC power converting device that is based on power electronics technology. This device can effectively replace traditional iron-core transformers for voltage conversion and offers several advantages. Firstly, the power device described herein has a high conversion efficiency, reducing heat issues. Secondly, because it utilizes power electronics technology, the device's weight and size may be significantly reduced, making it easier for travelers to carry. Moreover, the lighter power device can also reduce transportation costs and carbon emissions during transportation, making it more environmentally friendly.

Another important advantage of the power converter described herein is that by providing a more portable and cost-effective power conversion device, people can avoid buying too many electronic devices and appliances, thus better protecting the environment, and reducing electronic waste. People may be able to use the same electronic devices under different voltage standards in different countries, without needing to buy additional devices to adapt to local voltage standards. Additionally, those who buy imported appliances may also benefit from this portable power converter, enabling them to use appliances without barriers in different countries, avoiding the repeated purchase of appliances with different voltage standards, and thus reducing electronic waste.

Figure 1:
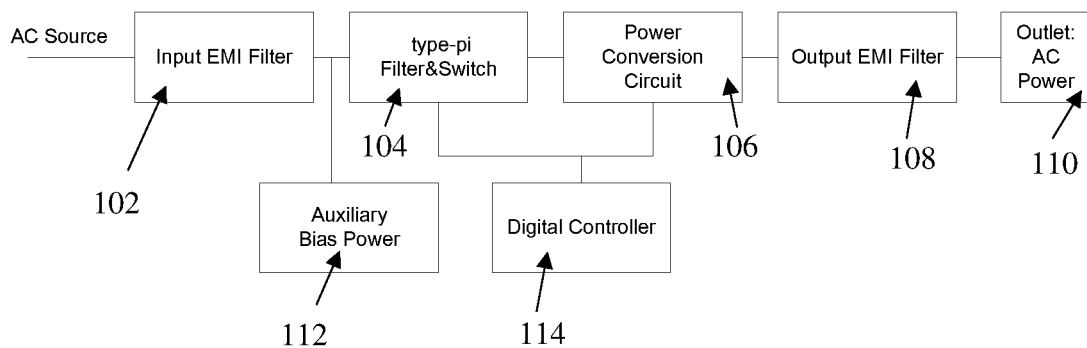
FIG. 1 illustrates power converter in accordance with some embodiments.

Now referring to FIG. 1, an embodiment of a power converter 100 is illustrated. As shown in FIG. 1, the power converter 100 comprises an input EMI filter module 102, a filter and switch module 104, a power conversion circuit module 106, an auxiliary bias power module 112, and a digital controller module 114. In some embodiments, the filter and switch module 104 may comprise a type-pi filter and switch. A type Pi filters is a type of passive filter that may comprise either a low pass or a high pass filter. The digital controller module 114 may obtain an amplitude, phase, and frequency information of the AC source voltage through a grid voltage sense module (not shown in FIG. 1), and retrieve amplitude and phase information of the output voltage through an output voltage sense module (not shown in FIG. 1). The digital controller module 114 may send an indication to the type-pi filter and switch 104 and to the power conversion circuit 106. The aforementioned indication may comprise an indication to turn on or to turn off. The digital controller module 114 initially checks an amplitude, frequency, and phase information of the AC source voltage through the input voltage sense module. If the above parameters are met, the digital controller module then controls the type-pi filter and switch module to engage the power (e.g., send a turn on indication).

In some embodiments, a function of the power converter 100 is to convert voltages (e.g., between AC220V and AC240V voltage to a voltage of between AC100V and AC120V). The power converter 100, as shown in FIG. 1, may comprise high-speed semiconductor switching devices (e.g., IGBTs or MOSFETs), filter inductors, and filter capacitors. Under the control of the digital controller module 114, AC voltage/power (e.g., AC220V-AC240V) may be converted to a lower voltage (e.g., AC100V-AC120V). The input EMI filter 102 may reduce noise signals that are received from the power grid/AC source. The auxiliary bias power module 112 may generate a required bias power for other modules (e.g., module 106, module 104, etc.). The type-pi filter and switch module 104 may include a type-pi filter (as described above) and a switch, which controls a connection status of the power converter 100 with an AC source. The type-pi filter 104 may be used to filter the switching current that will be received by the power conversion circuit module 106. The output EMI filter 108 may be used to reduce the noise signals that are produced by the power conversion circuit module 106 and then transmitted to a load. The power conversion circuit 106 is described in more detail with respect to FIG. 2.

Figure 2:
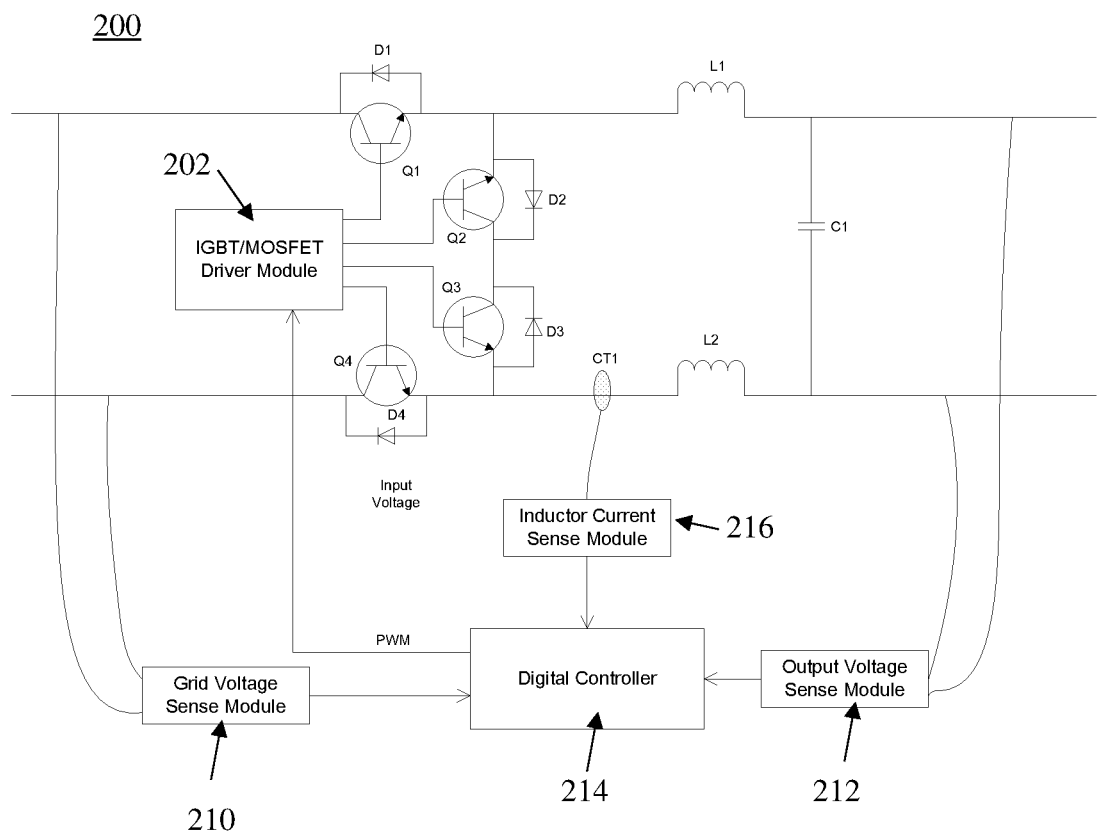
FIG. 2 illustrates a portion of a power converter in accordance with some embodiments.

FIG. 2 illustrates a power conversion circuit 200. Q1, Q2, Q3 and Q4 represent semiconductor switching devices (e.g., transistors such as, but not limited to, IGBT or MOSFET transistors) with diodes D1 and D2 serving as respective anti-parallel diodes for Q1 through Q4. Q1 through Q4 may be controlled by an IGBT/MOSFET driver module 202. An upstream control signal PWM may originate from the digital controller module 214. A function of Q1 through Q4 is to chop the input voltage (e.g., reduce the input voltage). L1, L2, and C1 form an output filtering circuit, which may filter out high-frequency harmonic current formed by the chopping (e.g., reducing) of the input voltage. The digital controller module 214 may obtain an amplitude, phase, and frequency information of the power grid voltage through the grid voltage sense module 210, and may retrieve the amplitude and phase information of the output voltage through the output voltage sense module 212. The inductor current amplitude may be obtained through the inductor current sense module 216. The power converter's operating condition can be further determined based on the inductor current and output voltage: whether it is in a normal state, an output overload state or an output short-circuit state, etc.

Figure 3:
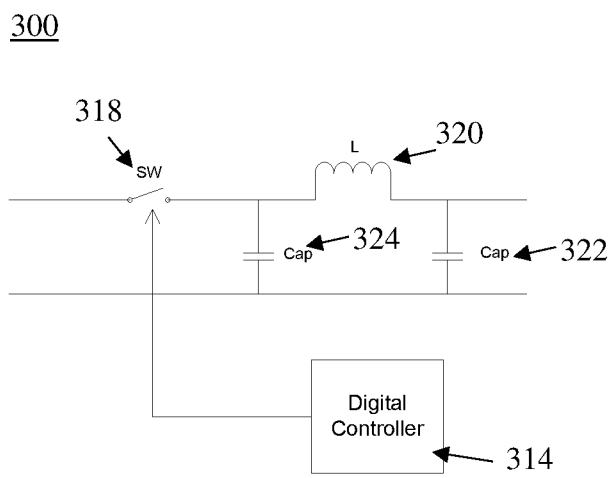
FIG. 3 illustrates a portion of a power converter in accordance with some embodiments.

Now referring to FIG. 3, an embodiment of a type-pi filter and switch module 300 is illustrated. The type-pi filter 300 may include, at least, one inductor 320 and two capacitors 322/324. The type-pi filter's 300 primary function may be to filter out larger harmonic currents generated at power level and preventing them from contaminating the power grid/AC Source. In some embodiments, if this filter is not present, harmonic currents may feedback into the power grid/AC Source causing electric grid pollution. Electric grid pollution refers to undesirable waves and interferences in the power grid that degrade power quality. The switch 218 may be controlled by a digital controller module 314 (such as digital controller module 114 or 214) with the digital controller 314 sending a signal to turn the switch 318 on or off. The switch's 318 main role is to isolate a power-level circuit from the power grid. When the digital controller 314 is not ready, or when the digital controller 314 detects a system failure, the digital controller 314 may send a signal to the switch 318 to disconnect, thus isolating the power-level circuit from the power grid and preventing a relatively high-power grid voltage from being brought out to an output terminal of the power converter.

Figure 4:
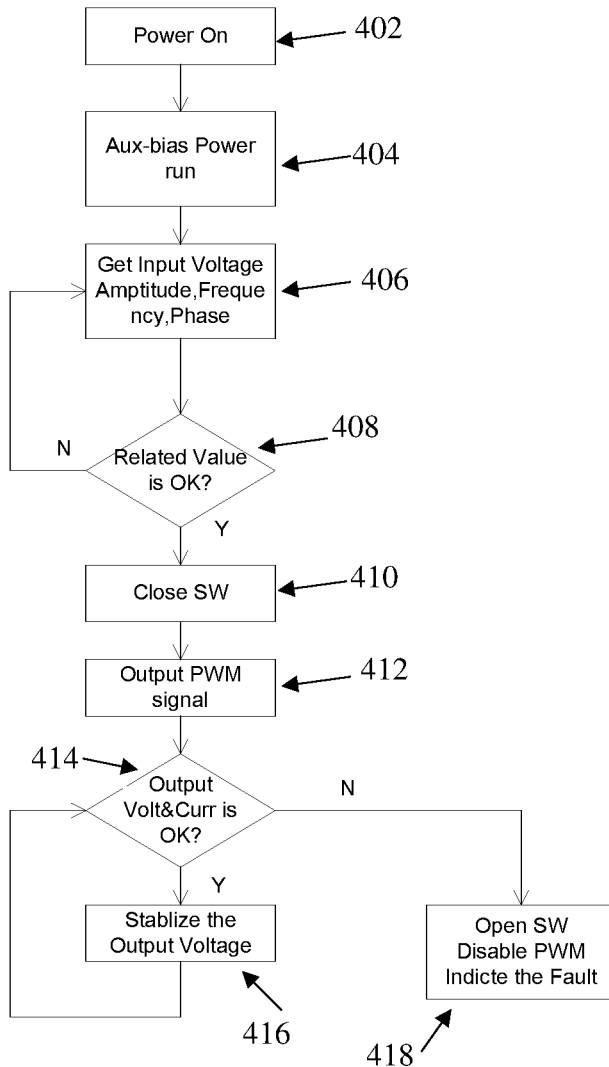
FIG. 4 illustrates a method in accordance with some embodiments.

Now referring to FIG. 4, a method 400 is illustrated. The method 400 may performed by an electronic device, such as power converter 100, described with respect to FIG. 1. The method described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

In some embodiments, FIG. 4 may illustrate a control process associated with a power converter such as power converter 100. After the power converter is connected to the power grid and the power is turned on at 402, an auxiliary bias power module first provides a required bias power for all modules at 404. The digital controller module initially checks the amplitude, frequency, and phase information of the power grid voltage at 406 through an input voltage sense module. If the above parameters are met at 408, the digital controller module then controls the type-pi filter and switch module at 410 (e.g., closes or opens the switch) to engage the power grid.

This allows the power grid to be directly connected to the power conversion circuit module. The digital controller module issues a PWM signal at 412 to put the power conversion circuit module in a working state and continuously monitors the output voltage value via the output voltage sense module and the inductor current through the inductor current sense module. The operational status of the device may be determined based on these monitored parameters with operations statuses being: normal status, output overload status, output short circuit status, etc. During normal operation of the power converter, the digital controller module may continuously monitor the power grid voltage information at 414. If the amplitude, frequency, or phase of the power grid voltage exceeds the set range, the device may initiate fault protection at 418 by turning off all PWM drive signals, disconnecting the input switch (e.g., switch 318), and using an indicator light to alert the user. If the amplitude, frequency, or phase of the power grid voltage is in a normal range, the device continues to function by keeping the output voltage at a desired output voltage at 416.

This written description uses examples to disclose multiple embodiments, including the preferred embodiments, and to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A power converter comprising:
   an input electromagnetic interference filter configured to receive raw AC power from an AC power source and to output filtered AC power;
   an active type-pi filter comprising a switch, two capacitors, and an inductor, wherein the active type-pi filter is configured for (i) receiving the filtered AC power, (ii) further filtering the received filtered AC power, (iii) receiving an indication signal from a digital controller that an amplitude, frequency, and phase information of the filtered AC power are within a range of acceptable values and (iv) outputting the further filtered AC power;
   the digital controller configured to send the indication signal to the active type-pi filter and to send a PWM signal to a power conversion circuit;
   the power conversion circuit comprising four semiconductor switching devices, two inductors, a grid voltage sense module, an inductor current sense module and an output voltage sense module, wherein the power conversion circuit is configured to (i) receive the PWM signal from the digital controller, (ii) receive the further filtered AC power from the active type-pi filter, (iii) convert the further filtered AC power to a desired voltage and (iv) output the desired voltage;

an auxiliary bias power configured to provide power to the active type-pi filter and to the power conversion circuit; and an output electromagnetic interference filter configured to receive the desired voltage from the power conversion circuit and to output a filtered converted AC power to an AC power load, wherein the indication signal is configured to turn off the switch of the active type-pi filter to isolate the power conversion circuit from the AC power source when a system failure is detected by the digital controller, and wherein the digital controller is configured to send the PWM signal to control the four semiconductor switching devices of the power conversion circuit based on information received from the grid voltage sense module, the inductor current sense module, and the output voltage sense module.

2. The power converter of claim 1 wherein the four semiconductor switching devices are configured for chopping an input voltage.

\* \* \* \* \*